United States Patent
Albrecht et al.

(10) Patent No.: US 12,337,918 B2
(45) Date of Patent: Jun. 24, 2025

(54) SEAT DEVICE FOR A TILTING VEHICLE

(71) Applicant: Bayerische Motoren Werke Aktiengesellschaft, Munich (DE)

(72) Inventors: Stephan Albrecht, Gmund am Tegernsee (DE); Matthias Goetz, Munich (DE); Philipp Hutterer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 113 days.

(21) Appl. No.: 18/013,351

(22) PCT Filed: Jul. 7, 2021

(86) PCT No.: PCT/EP2021/068730
§ 371 (c)(1),
(2) Date: Dec. 28, 2022

(87) PCT Pub. No.: WO2022/037841
PCT Pub. Date: Feb. 24, 2022

(65) Prior Publication Data
US 2023/0294783 A1    Sep. 21, 2023

(30) Foreign Application Priority Data
Aug. 19, 2020   (DE) .................. 10 2020 121 719.6

(51) Int. Cl.
*B62J 1/12*   (2006.01)
*B62J 9/24*   (2020.01)

(52) U.S. Cl.
CPC .. *B62J 1/12* (2013.01); *B62J 9/24* (2020.02)

(58) Field of Classification Search
CPC ..................................... B62J 1/12; B62J 9/24
See application file for complete search history.

(56) References Cited

U.S. PATENT DOCUMENTS

| 5,558,260 A | * | 9/1996 | Reichert | ................... | B62J 1/14 |
| | | | | | 224/415 |
| 5,713,629 A | * | 2/1998 | Plackis | ...................... | B62J 1/12 |
| | | | | | 297/195.1 |

(Continued)

FOREIGN PATENT DOCUMENTS

| DE | 10 2006 046 005 A1 | 4/2007 |
| EP | 3 127 794 A1 | 2/2017 |

(Continued)

OTHER PUBLICATIONS

International Search Report (PCT/ISA/210) issued in PCT Application No. PCT/JP2021/068730 dated Sep. 30, 2021 with English translation (seven (7) pages).

(Continued)

*Primary Examiner* — Anthony D Barfield
(74) *Attorney, Agent, or Firm* — Crowell & Moring LLP

(57) ABSTRACT

A seat device for a tilting vehicle has at least one seat bench, at least one frame structure, which includes an element of a vehicle frame of the tilting vehicle or can be or is fixed to the vehicle frame and on which the seat bench can be or is fixed, and at least one holding device, which includes at least one carrier, which is directly or indirectly fixed to the frame structure, and which includes at least one receiving unit which can be or is releasably arranged on the carrier and on which an auxiliary body can be arranged and, by way of a coupling device fixed to the auxiliary body, can be releasably fixed to the receiving unit.

7 Claims, 4 Drawing Sheets

(56) References Cited

U.S. PATENT DOCUMENTS

| | | | | |
|---|---|---|---|---|
| 7,111,903 | B1* | 9/2006 | Snelson | B62J 1/12 |
| | | | | 297/256.16 |
| 9,682,737 | B2* | 6/2017 | Mori | B62J 1/12 |
| 10,086,893 | B2* | 10/2018 | Ogawa | B62J 1/12 |
| 2011/0139843 | A1 | 6/2011 | Thomas et al. | |
| 2014/0167387 | A1 | 6/2014 | Komatsu et al. | |

FOREIGN PATENT DOCUMENTS

| | | | |
|---|---|---|---|
| JP | 58-190283 U | 12/1983 | |
| JP | 59-64381 U | 4/1984 | |
| JP | 11-263261 A | 9/1999 | |
| JP | 2014-213733 A | 11/2014 | |
| KR | 100942247 B1 | 2/2010 | |
| WO | WO 2016/038530 A1 | 3/2016 | |
| WO | WO 2017/203544 A1 | 11/2017 | |

OTHER PUBLICATIONS

Japanese-language Written Opinion (PCT/ISA/237) issued in PCT Application No. PCT/JP2021/068730 dated Sep. 30, 2021 (five (5) pages).

German-language Search Report issued in German Application No. 10 2020 121 719.6 dated May 3, 2021 with partial English translation (10 pages).

* cited by examiner

SEAT DEVICE FOR A TILTING VEHICLE

BACKGROUND AND SUMMARY OF THE INVENTION

The invention relates to a seat apparatus for a tilting vehicle.

Seat apparatuses for tilting vehicles are known in different embodiments and variants from the prior art. On the one hand, tilting vehicles are known with seat apparatuses in which the seat apparatus as a whole comprises a bench type seat on which both a user of the tilting vehicle and an additional passenger, a so-called pillion passenger, can be arranged.

Furthermore, seat apparatuses for tilting vehicles in which a luggage bridge or a bracket can be securely and permanently installed on the bench type seat are known. They may extend over the bench type seat and reduce the space for an additional passenger. In order to ensure road safety, these luggage bridges should be installed by technical operators, which has been found to be complex, time-consuming and poorly flexible.

An object of an embodiment of the invention is to provide a seat apparatus for a tilting vehicle on which an auxiliary member can be arranged in a simple and roadworthy manner.

This object is achieved with a seat apparatus for a tilting vehicle having at least one bench type seat, having at least one frame structure which comprises an element of a vehicle frame of the tilting vehicle or which can be or is secured to the vehicle frame and can be or is secured to the bench type seat, and having at least one retention device which comprises at least one carrier which is secured directly or indirectly to the frame structure and which comprises at least one receiving unit which can be or is arranged in a releasable manner on the carrier and on which an auxiliary member can be arranged and can be releasably secured to the receiving unit by way of a coupling device which is secured to the auxiliary member.

As a result of the fact that the seat apparatus comprises a carrier which is secured directly or indirectly to the frame structure, an element of the retention device can be permanently mounted on the seat apparatus in a roadworthy manner. As a result of the fact that the receiving unit can be releasably arranged on the carrier and an auxiliary member can be arranged on the receiving unit, the receiving unit and the auxiliary member can be secured as required in a flexible manner by a user of the tilting vehicle without additional support from a technical person.

The receiving unit may in principle be freely secured to the carrier structure. Embodiments of the seat apparatus are conceivable in which the receiving unit can be arranged at a side of the carrier facing away from the bench type seat. In such a case, the auxiliary member is arranged below the bench type seat. Furthermore, embodiments of the seat apparatus are conceivable in which the receiving unit can be secured adjacent to the bench type seat, in particular in a manner overlapping an end of the bench type seat. In such a case, the auxiliary member is arranged adjacent to the bench type seat and the bench type seat is arranged in continuation counter to the travel direction.

Embodiments of the seat apparatus are preferred in which the receiving unit is or can be arranged in the joined arrangement at the side of the carrier facing the bench type seat and/or in which the receiving unit at least partially or completely overlaps the bench type seat at a side facing away from the frame structure and/or comprises a portion of the bench type seat which continues the bench type seat.

When the receiving unit can be arranged in the joined arrangement at the side of the carrier facing the bench type seat, a flexible configuration of the bench type seat is advantageous. In such a case, for example, the auxiliary member may comprise a portion of the bench type seat, which portion can be secured to the receiving unit. In such a case, the seat face of the bench type seat can be expanded. Furthermore, the auxiliary member which is in the form of an additional portion of the bench type seat may comprise a backrest or the like.

When the receiving unit is arranged in the joined arrangement at the side of the carrier facing the bench type seat and at least partially overlaps the bench type seat at a side facing away from the frame structure, a portion of the seat face of the bench type seat can be used at least temporarily for transporting an auxiliary member which may comprise, for example, a pocket, a helmet compartment, a transport container (top case), a luggage roll or the like. The receiving unit may in this instance form a luggage bridge.

Furthermore, it has been found to be advantageous for the carrier to comprise an element of the frame structure or to be secured to the frame structure in a non-releasable manner or for the carrier to be able to be secured or to be secured to the frame structure in a releasable manner.

When the carrier comprises an element of the frame structure, the carrier and frame structure may form a common component, in particular the carrier may be formed by a portion of the frame structure. The seat apparatus can thereby be constructed with a reduced number of components. When the carrier is secured to the frame structure in a non-releasable manner, this may, for example, be carried out by way of adhesive bonding, welding or the like.

When the carrier can be or is releasably secured to the frame structure, the seat apparatus can be retrofitted in a simple manner.

Furthermore, in embodiments of the seat apparatus, the carrier and the receiving unit may form an integral common component or the carrier and the receiving unit may comprise components which are separate or can be separated from each other. When the carrier and the receiving unit form an integral common component, the number of components in the seat apparatus is reduced in a simple manner. This is found to be particularly advantageous when the bench type seat can be extended in the region of the carrier by a portion which continues the bench type seat and which is secured to the receiving unit. In such a case, the seat face of the bench type seat can be extended in a simple manner by the portion which continues the bench type seat or instead of a portion which continues the bench type seat can form a luggage bridge. The retention device can thereby be constructed in a compact manner.

When the carrier and receiving unit form components which are separate or can be separated from each other, the receiving unit may always be removed if the arrangement of an auxiliary member is not desirable or not required.

It has been found to be advantageous for the receiving unit to be able to be arranged on the carrier in a joining direction which extends parallel, transversely or obliquely with respect to the longitudinal axis of the tilting vehicle. The receiving unit may be able to be pushed onto the carrier in the joining direction or inserted onto the carrier.

In order to secure the receiving unit to the carrier, an embodiment of the seat apparatus comprises at least one locking element by way of which the receiving unit can be releasably secured to the carrier in a joined arrangement.

The securing by way of the locking element may be carried out in a positive-locking, non-positive-locking or frictionally engaging manner. In a development of the last-mentioned embodiment, it has been found to be advantageous for the locking element to comprise a clamping device, by way of which the receiving unit can be acted on with a clamping force and can be tensioned or clamped in the direction toward the carrier, particularly if the clamping device comprises a resilient element, a clamping lever and/or a clamping or spreader plate.

In such a case, a positive-locking, non-positive-locking or frictionally engaging connection between the receiving unit and carrier can be further improved.

The clamping device may, for example, comprise a clamping lever which can be moved by manual activation from an open position into a closed position, wherein the movement of the clamping lever from the open position into a closed position increases a clamping force applied. Furthermore, a clamping device which is in the form of a clamping lever may additionally form a rear grip of the receiving unit with the carrier when the receiving unit, for example, comprises a pincer-like portion which is placed on a corresponding portion of the receiving unit and which is produced by turning over the clamping lever of the rear grip.

When the clamping device comprises, for example, a resilient element, the receiving unit can engage with locking projections which are pretensioned by the resilient elements in corresponding recesses in the carrier.

When the clamping device comprises a clamping or spreader plate, a clamping force which is produced between the receiving unit and the carrier can also be amplified.

Additionally or alternatively to the last-mentioned embodiments, in a seat apparatus there may be provision for the locking element to comprise a locking device, by way of which the receiving unit can be secured to the carrier by forming a rear grip with respect to the joining direction.

In such a case, additionally or alternatively, an undercut and a positive-locking connection can be produced.

In order to secure the auxiliary member to the receiving unit in a simple manner, it has been found to be advantageous for the coupling device to comprise on the auxiliary member a projection, by way of which the auxiliary member can be or is releasably secured to the receiving unit and/or the carrier and/or for the coupling device to comprise an automatically or manually actuatable unlocking device, by way of which the coupling device can be released from the receiving unit and/or the carrier.

As a result of the provision of a coupling device on the auxiliary member in the form of a projection and as a result of the provision of an unlocking device, the auxiliary member can be secured to the receiving unit in a simple manner and released again.

The functionality of the seat apparatus can be improved when the seat apparatus comprises, for a user of the tilting vehicle, at least one gripping unit which can be or is secured directly to the frame structure and/or which is formed by at least one portion of the carrier and/or the receiving unit.

When the gripping unit is formed by the frame structure or the carrier, the gripping unit is constructed to be secured to the vehicle. When the frame structure forms the gripping unit, the frame structure and gripping unit may comprise a common integral component. In such a case, the seat apparatus can be constructed with fewer components. When the carrier comprises the gripping unit, as a result of the arrangement of the carrier on the frame structure, a gripping unit can simply be retrofitted. An additional user of the tilting vehicle, in particular a pillion passenger, can thereby secure themselves on the tilting vehicle.

When the gripping unit is formed on the receiving unit, the gripping unit is constructed to be secured to the luggage bridge.

In a development of the last-mentioned embodiments, grips of the gripping unit may be secured in a fixed manner relative to the tilting vehicle or moved from a storage position into a working position, in which the grips of the gripping unit can be gripped by a user of the tilting vehicle. In such a case, the grip may be constructed in a telescope-like or pivotable manner.

Other features, details and advantages of the invention will be appreciated from the appended patent claims, from the drawings and the following description of preferred embodiments of the seat apparatus.

DETAILED DESCRIPTION OF THE DRAWINGS

Figure 1:
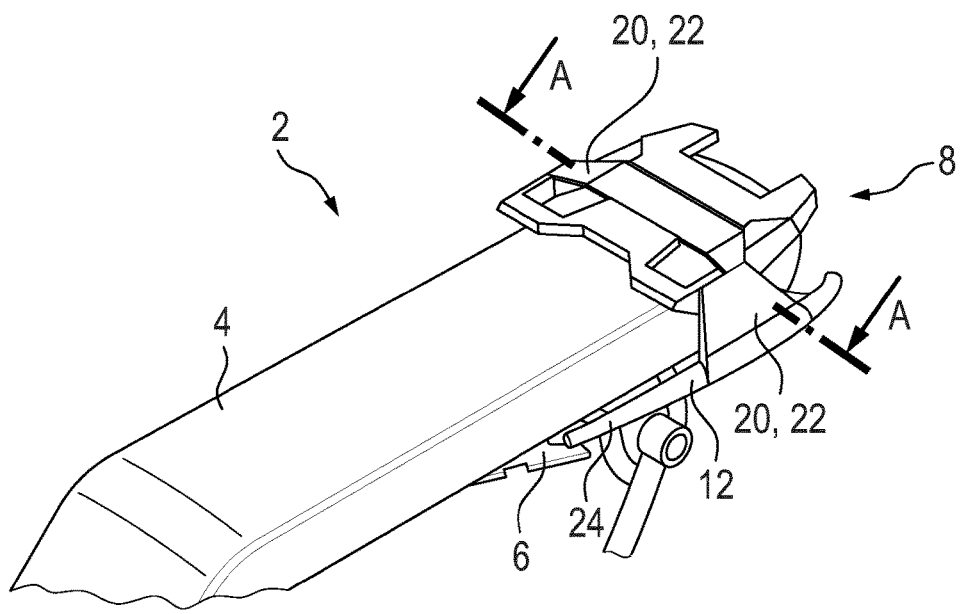
FIG. 1 shows a perspective front view of a first embodiment of the seat apparatus.

The Figures show embodiments of a seat apparatus for a tilting vehicle (not shown explicitly in the Figures), which seat apparatus is generally designated 2. The seat apparatus 2 comprises a bench type seat 4, on which a user of the tilting vehicle can be arranged in a seated manner. Furthermore, the seat apparatus 2 comprises a frame structure 6 which comprises an element of a vehicle frame of the tilting vehicle. The seat apparatus 2 comprises a retention device 8 on which auxiliary members 10 can be arranged. To this end, the retention device 8 comprises a carrier 12 which in the embodiments shown in the Figures is secured directly to the frame structure 8. On the carrier 12 of the retention device 8, there is releasably arranged a receiving unit 14 on which the auxiliary member 10 can be arranged and can be releasably secured in the receiving unit 10 by way of a coupling device 16 which is secured to the auxiliary member 10.

The Figures show embodiments of the seat apparatus 2 in which the carrier 12 of the retention device 8 is secured in each case in a non-releasable manner to the frame structure 6.

In the embodiments shown in the Figures, the receiving unit 14 is arranged in each case at a side of the carrier 12 facing the bench type seat 4. In the embodiments according to FIGS. 1, 4 and 5, the receiving unit 14 overlaps the bench type seat 4 at the side of the bench type seat 4 facing away from the frame structure 6. In the embodiments according to FIGS. 6 and 7, the receiving unit 14 directly abuts the frame structure 6 at the side facing the bench type seat 4.

Figure 2:
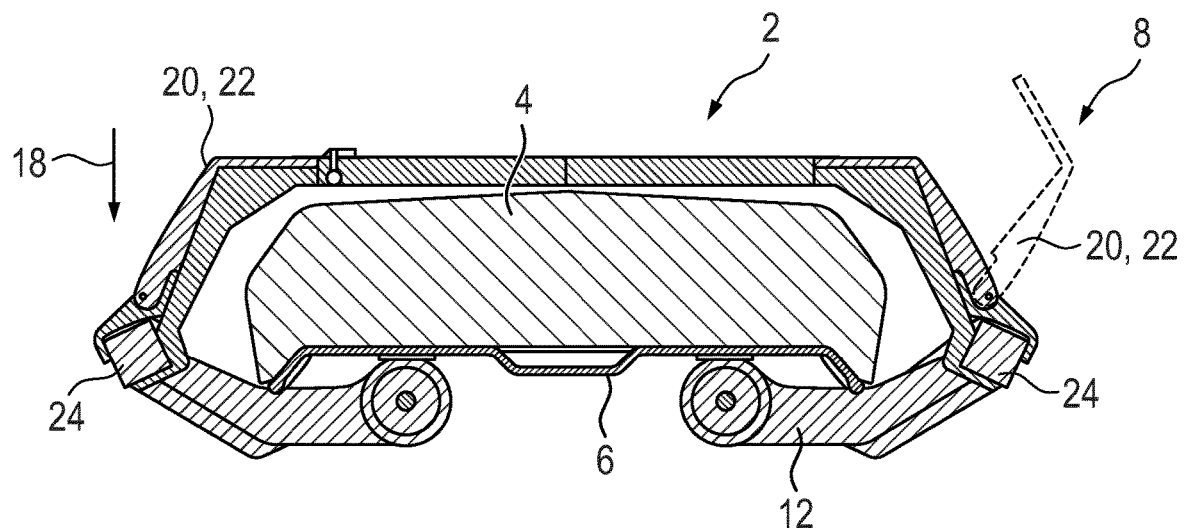
FIG. 2 shows a sectioned view through the line A-A according to FIG. 1.
Figure 3:
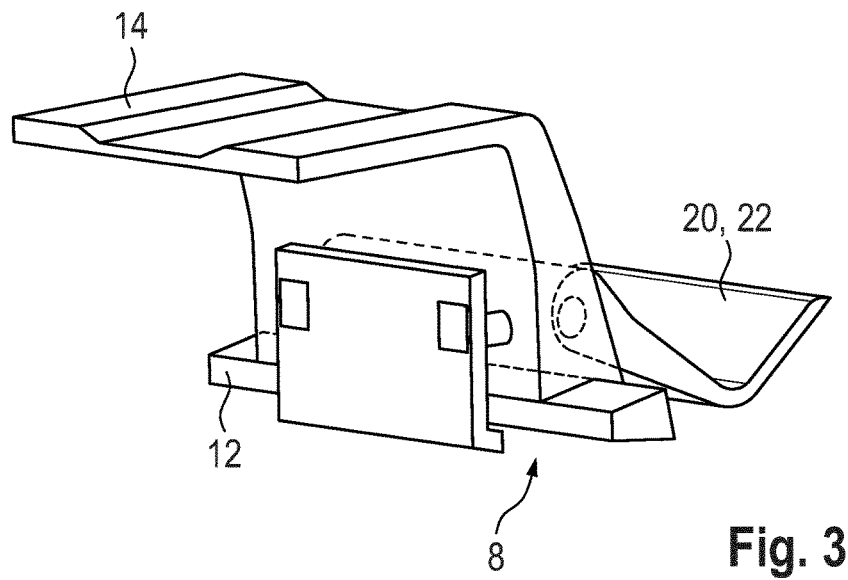
FIG. 3 shows a perspective detailed view of a portion of a receiving unit of the embodiment of FIGS. 1 and 2.

FIGS. 1 to 3 show an embodiment of the seat apparatus 2 in which the receiving unit 14 can be arranged on the carrier 12 in a joining direction 18 which extends transversely to the longitudinal axis of the tilting vehicle. To this end, the receiving unit 14 has pincer-like ends which can be arranged on a corresponding portion of the carrier 12 by way of clamping. In order to secure the receiving unit 14, the embodiment according to FIGS. 1 to 3 comprises a locking element 20 which is formed by a clamping lever 22.

The carrier 12 according to the embodiment of FIGS. 1 to 3 additionally comprises a gripping unit 24 which can be manually gripped by a user of the tilting vehicle. The receiving unit 14 is clamped to the gripping unit 24 in such a case.

Figure 4:
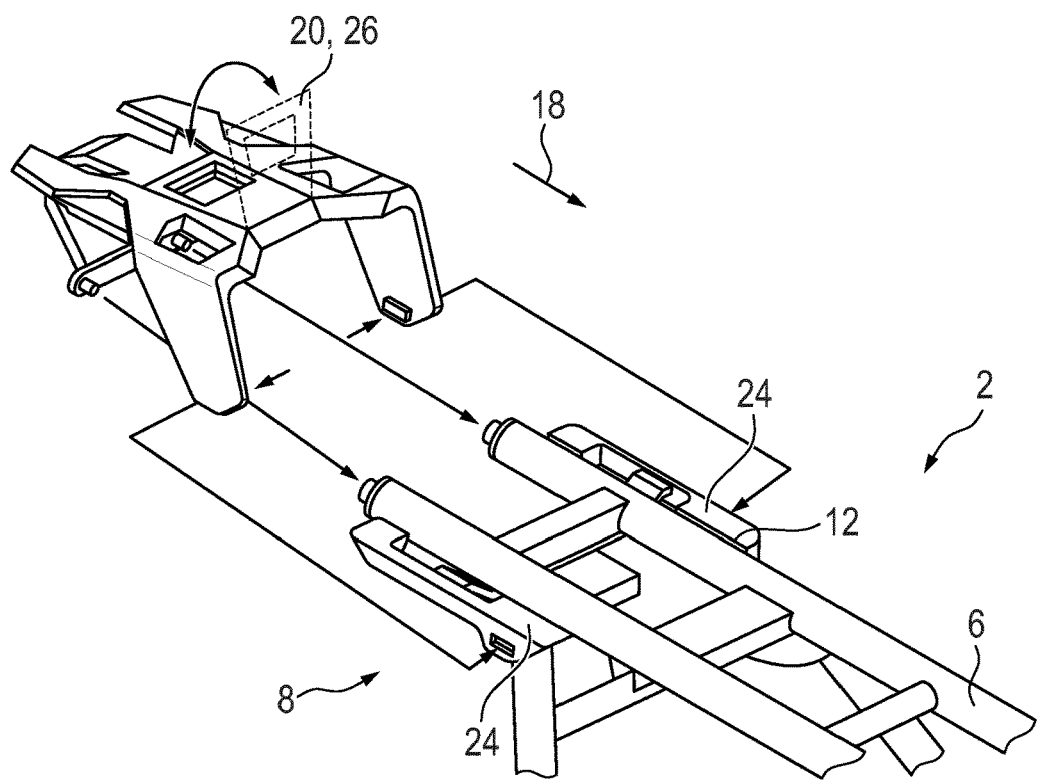
FIG. 4 shows a perspective exploded illustration of a second embodiment of the seat apparatus.

FIG. 4 shows a second embodiment of the seat apparatus 2. Also in the embodiment according to FIG. 2, the receiving unit 14 forms a gripping unit 24. In order to join the receiving unit 14 to the carrier 12, in the embodiment according to FIG. 4 the joining direction 18 extends parallel with the longitudinal axis of the tilting vehicle. In order to connect the receiving unit 14 to the carrier 12 in a joined arrangement, the locking element 20 of the embodiment according to FIG. 4 comprises a spreader plate 26.

Figure 5:
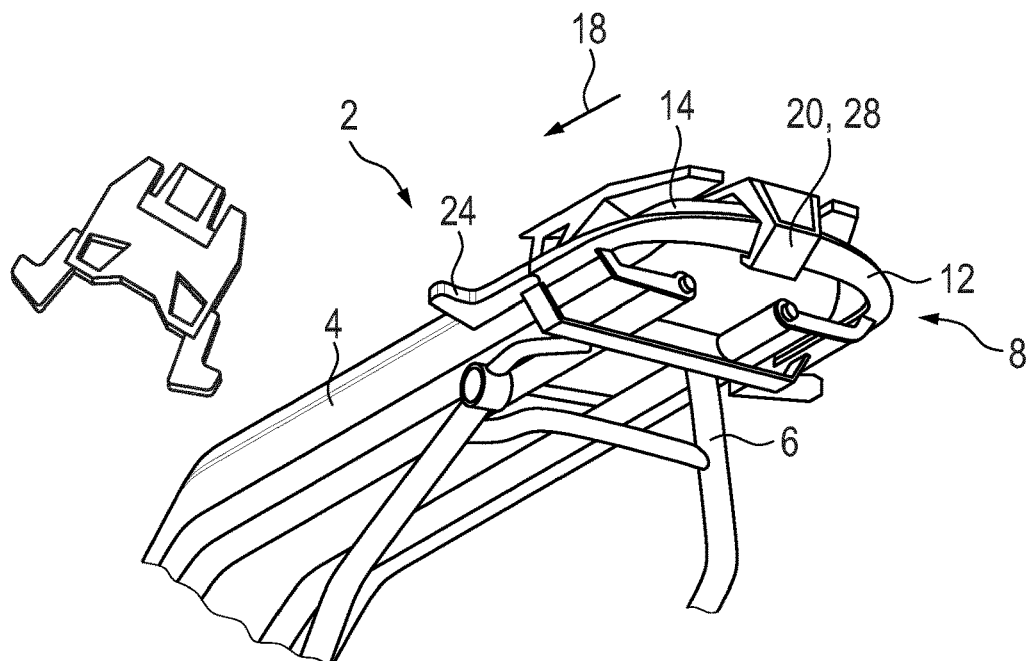
FIG. 5 shows an exploded perspective illustration of a third embodiment of the seat apparatus.

FIG. 5 shows a third embodiment of the seat apparatus 2. Also in the embodiment according to FIG. 5, the receiving unit 14 for joining to the carrier 12 is joined in a joining direction 18 which extends parallel with the longitudinal axis of the tilting vehicle. In a joined arrangement, a locking element 20 which is in the form of a locking device 28 engages with a portion of the carrier 12.

In the embodiment according to FIG. 5, the gripping unit 24 is constructed to be secured to the luggage bridge, that is to say, on the receiving unit 14.

Figure 6:
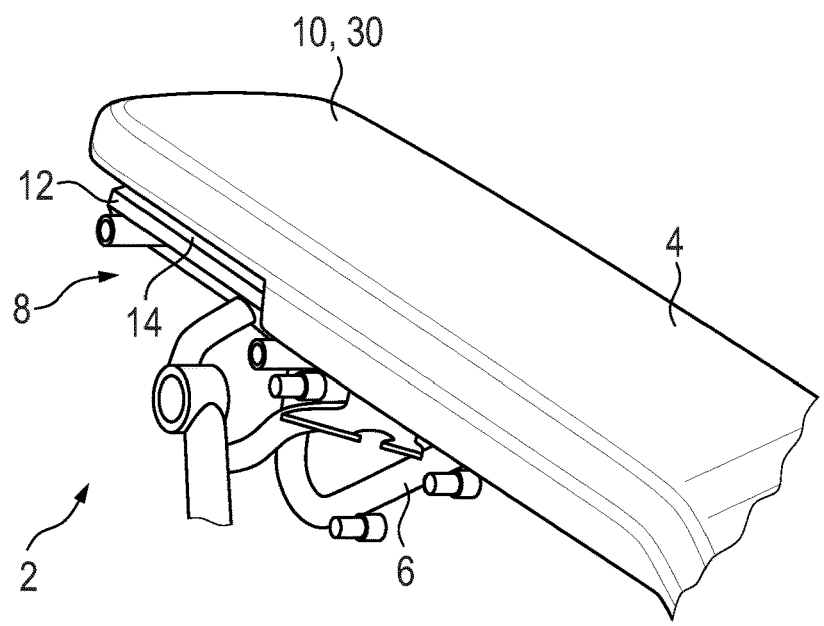
FIG. 6 shows a perspective front view of a fourth embodiment of the seat apparatus.
Figure 7:
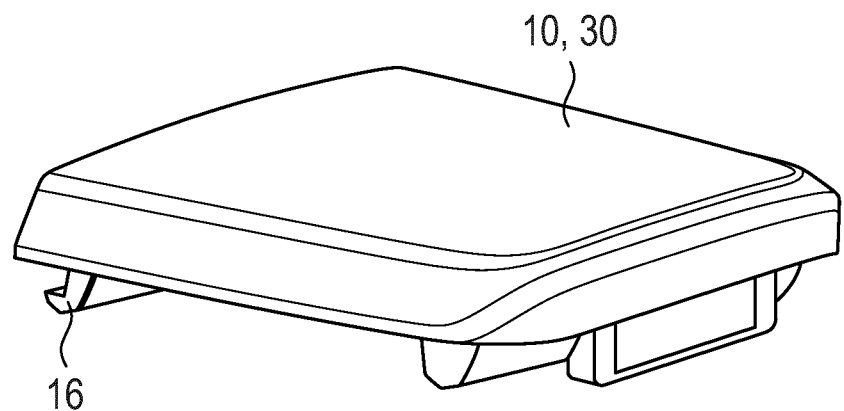
FIG. 7 shows a detailed view of an auxiliary member which is in the form of a portion of a bench type seat according to FIG. 6.
Figure 8:
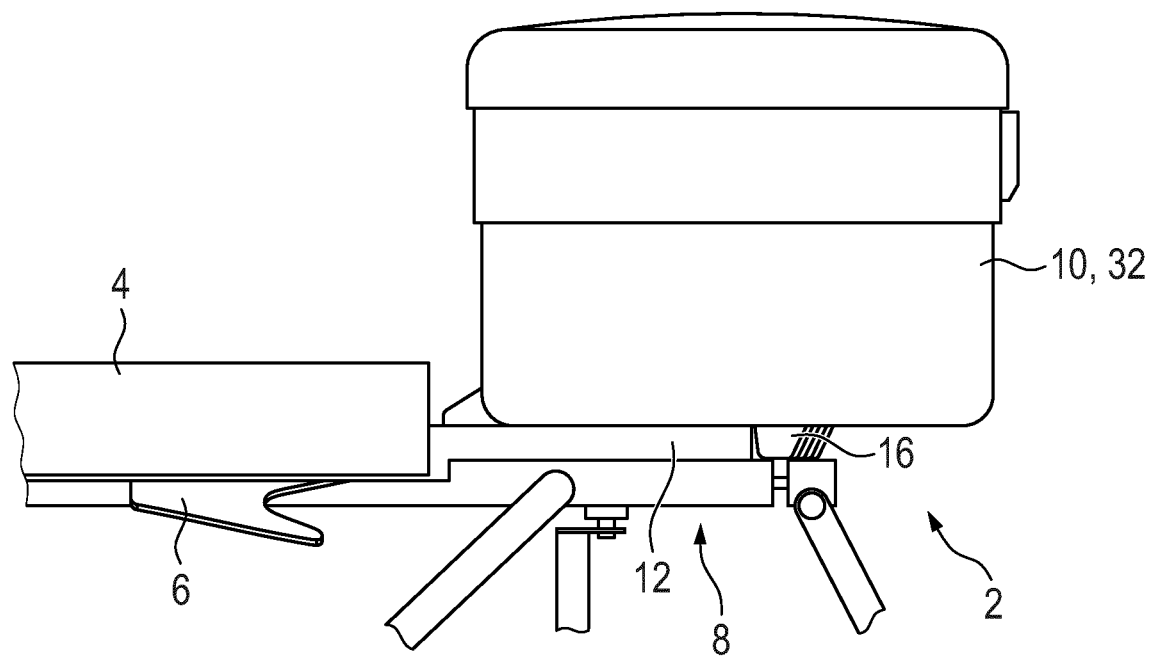
FIG. 8 shows a side view of a fifth embodiment of the seat apparatus.

FIGS. 6 and 7 shows a fourth embodiment of the seat apparatus 2. In this embodiment, the auxiliary member 10 comprises a portion 30 which continues the bench type seat 4 and which can be secured to the receiving unit 14 by way of a coupling device 16 which is in the form of a projection.

FIG. 7 shows a fifth embodiment of the seat apparatus 2 which is similar to the embodiment according to FIG. 6. Instead of securing a portion 30 which continues the bench type seat 4, the auxiliary member 10 which can be arranged at that location comprises a transport container 32.

As a result of the construction of the receiving unit 14 directly on the frame structure 6 at the side of the frame structure 6 facing the bench type seat 4, a portion 30 which continues the bench type seat 4 or a transport container 32 can be selectively arranged.

The features of the invention disclosed in the above description, in the claims and in the drawings may be significant both individually and in any desired combination in the implementation of the invention in the various embodiments thereof.

LIST OF REFERENCE NUMERALS

2 Seat apparatus
4 Bench type seat
6 Frame structure
8 Retention device
10 Auxiliary member
12 Carrier device
14 Receiving unit
16 Coupling device
18 Joining direction
20 Locking element
22 Clamping lever
24 Gripping unit
26 Spreader plate
28 Locking device
30 Portion which continues the bench type seat
32 Transport container

The invention claimed is:

1. A seat apparatus for a tilting vehicle, the seat apparatus comprising:
   a bench type seat,
   a frame structure which comprises an element of a vehicle frame of the tilting vehicle or which is securable or is secured to the vehicle frame and is securable or is secured to the bench type seat,
   a retention device which comprises at least one carrier which is secured directly or indirectly to the frame structure and which comprises at least one receiving unit which is arrangeable or is arranged in a releasable manner on the carrier and on which an auxiliary member is arrangeable and is releasably securable to the receiving unit by way of a coupling device which is secured to the auxiliary member, and
   a locking element by way of which the receiving unit is releasably securable to the carrier in a joined arrangement,
   wherein the locking element comprises a locking device, by way of which the receiving unit is securable to the carrier by forming a rear grip with respect to a joining direction, and
   wherein the locking device comprises a clamping device that is configured to hook around adjacent edges of the receiving unit and the carrier.

2. The seat apparatus according to claim 1, wherein at least one of:
   the receiving unit is arrangeable or is arranged in a joined arrangement at a side of the carrier facing the bench type seat,
   the receiving unit at least partially or completely overlaps the bench type seat at a side facing away from the frame structure, or
   the receiving unit comprises a portion of the bench type seat which continues the bench type seat.

3. The seat apparatus according to claim 1, wherein:
   the carrier comprises an element of the frame structure or is secured to the frame structure in a non-releasable manner, or
   the carrier is securable or is secured to the frame structure in a releasable manner.

4. The seat apparatus according to claim 1, wherein:
   the carrier and the receiving unit comprise components which are separate or are separable from each other.

5. The seat apparatus according to claim 1, wherein the receiving unit is arrangeable on the carrier in a joining direction which extends parallel, transversely or obliquely with respect to a longitudinal axis of the tilting vehicle.

6. The seat apparatus according to claim 1, wherein at least one of:
   the coupling device comprises, on the auxiliary member, a projection, by way of which the auxiliary member is releasably securable or is releasably secured to at least one of the receiving unit or the carrier, or
   the coupling device comprises an automatically or manually actuatable unlocking device, by way of which the coupling device is releasable from at least one of the receiving unit or the carrier.

7. The seat apparatus according to claim 1, further comprising:
    for a user of the tilting vehicle, at least one gripping unit which is securable or is secured directly to the frame structure and/or which is formed by at least one portion of the carrier and/or the receiving unit.

\* \* \* \* \*